United States Patent [19]
Eisenhauer et al.

[11] Patent Number: 4,653,046
[45] Date of Patent: Mar. 24, 1987

[54] SINGLE CHANNEL SUBSCRIBER CARRIER SYSTEM

[75] Inventors: Gary Eisenhauer; Frank Simokat, both of Lakeland, Fla.

[73] Assignee: Brand-Rex Company, Willimantic, Conn.

[21] Appl. No.: 621,669

[22] Filed: Jun. 18, 1984

[51] Int. Cl.$^4$ .......................... H04J 1/02; H04B 3/54; H04H 1/08; H04M 11/08
[52] U.S. Cl. ........................................ 370/72; 370/71; 379/65
[58] Field of Search ...................... 370/71, 72; 179/70, 179/77, 2.51

[56] References Cited

U.S. PATENT DOCUMENTS

| | | | |
|---|---|---|---|
| 2,721,897 | 10/1955 | Schneckloth | 179/2.51 |
| 3,116,371 | 12/1963 | Krasin | 370/71 |
| 3,510,584 | 5/1970 | Krasin et al. | 370/71 |
| 3,624,300 | 11/1971 | Krasin et al. | 370/71 |
| 3,781,483 | 12/1973 | Deisch | 179/70 |
| 3,902,017 | 8/1975 | Steward | 370/71 |

Primary Examiner—Douglas W. Olms
Assistant Examiner—Wellington Chin
Attorney, Agent, or Firm—McCormick, Paulding and Huber

[57] ABSTRACT

There is provided an improved subscriber carrier system which enables the transmission of both voice frequencies and carrier frequencies by a common line without the need for a battery at the subscriber carrier terminal to supply power for the subscriber carrier electronics. A high voltage power supply is utilized to supply power, both for the voice frequency terminal and the subscriber carrier terminal. Loop supervision circuitry is isolated from the power supply. Ringing signals are detected and regenerated at a frequency to pass through the isolation circuit.

23 Claims, 2 Drawing Figures

SINGLE CHANNEL SUBSCRIBER CARRIER SYSTEM

BACKGROUND OF THE INVENTION

This invention relates to subscriber carrier telephone systems. More particularly, it relates to an improved single channel subscriber carrier telephone system.

Frequency multiplexed subscriber carrier telephone systems have been in existence for many years. In order to save the expense of installing a pair of conductors for each telephone subscriber, a single pair of conductors is used and a plurality of channels are created for simultaneous transmission by modulating a number of carrier frequencies with voice frequencies so that the channels do not interfere with one another. Sophisticated electronic circuitry has been devised to modulate and demodulate the carrier transmissions at the subscriber terminal and the central office terminal. An example of such sophisticated electronic circuitry is disclosed in U.S. Pat. No. 3,806,655, assigned to Carrier Telephone Corporation of America, where the object was to squeeze as many carrier channels onto a common pair of conductors.

In many instances, however, the need is to provide only one additional channel on a single pair of conductors. That type of use is known as a single channel subscriber carrier system. Since only one additional channel is needed, the electronic equipment for deriving the additional channel need not be nearly so sophisticated as the circuit described in U.S. Pat. No. 3,806,655. An example of a prior art single channel carrier system is shown in FIG. 1. Subscriber circuit terminal 10 is connected to central office circuit terminal 12 through a pair of metallic conductors 14 and 16, also referred to as the tip and ring conductors. Subscriber terminal 10 is connected to a standard telephone set through conductors 18 and 20. The central office terminal 12 is connected to the central office equipment through conductors 22 and 24. Carrier subscriber terminal 26 is connected to carrier central office 28, also through metallic conductors 14 and 16. Carrier circuits 26 and 28 include the electronics required to derive and decode the carrier signal which is applied to conductors 14 and 16. Carrier subscriber terminal 26 is connected to a telephone through conductors 30 and 32. Subscriber terminal 28 is connected to the central office through conductors 34 and 36. Isolation filters 38 and 40 are provided between the voice frequency subscriber terminal 10 and the carrier subscriber terminal 26, as well as between the voice frequency central office terminal 12 and the carrier frequency central office terminal 28 to isolate the carrier frequencies which normally will be in the range of 76 khz to 28 khz from the voice frequency central office and subscriber terminals.

Subscriber carrier terminal circuit 26 includes battery 42 to power the electronics in the subscriber carrier terminal. The battery is charged through a trickle of current supplied from the central office through central office terminal 12 and through battery charger 44. The amount of power which can be drawn from the central office to charge the battery 42 must be limited to a very small amount or that power will result in an off-hook indication to the central office or interfere with the central office's ability to accurately count dial pulse signals.

There are several other drawbacks to the circuit shown in FIG. 1. Both subscribers must be on hook for the battery 42 to charge properly. If the carrier subscriber is off hook excessively, the battery rapidly discharges, leaving the system inoperative. The loop resistance of the carrier channel is limited by the relatively low battery voltage. The battery 42 is a relatively unreliable component, requiring regular replacement. Furthermore, if either subscriber leaves his phone off hook, the battery does not charge properly or is discharged, and an unnecessary service call will result.

OBJECTS OF THE INVENTION

It is, therefore, one object of this invention to provide an improved subscriber carrier system.

It is another object to provide an improved single channel subscriber carrier telephone system.

It is another object to provide a telephone system utilizing both voice and carrier frequency channels on the same pair of conductors without the need for a battery.

It is another object to provide a single channel carrier telephone system having a longer carrier subscriber loop.

SUMMARY OF THE INVENTION

In accordance with one form of this invention, there is provided an electrical circuit for use with a voice frequency and station carrier telephone systems including a first subscriber terminal circuit which is adapted to transmit and receive information on voice frequencies. A second subscriber terminal circuit is provided and is adapted to transmit and receive information on carrier frequencies. The second subscriber circuit includes a means for modulating carrier frequencies with a voice signal to transmit a carrier signal and a means for demodulating carrier signals to convert the modulated carrier signals to voice frequencies. A first central office terminal circuit is also provided to transmit and receive information on voice frequencies. A second central office terminal circuit is adapted to transmit and receive information on carrier frequencies and includes means for modulating carrier frequencies with a voice signal to transmit carrier signals and also a means for demodulating modulated carrier signals to recover the voice frequencies.

A pair of metallic conductors connect the first and second subscriber terminal circuits to the first and second central office terminal circuits. The conductors transmit voice frequencies, modulated carrier frequencies and loop supervision information. A power supply is connected to the first and second subscriber terminal circuits for operating the first and second subscriber terminal circuits. A means is provided for isolating the first central office terminal circuit from the power supply so that the power supply does not interfere with normal loop supervision.

Another feature includes a means for detecting ringing signals at the first central office terminal circuit and a means for generating a signal in response to the ringing signals which will pass through the isolation means and on to the first subscriber terminal circuit without interfering with the second subscriber terminal circuit, and a means for detecting the signal at the subscriber terminal and regenerating a signal suitable for ringing the subscriber's telephone.

BRIEF DESCRIPTION OF THE DRAWINGS

The subject matter which is regarded as the invention is set forth in the appended claims. The invention itself, however, together with further objects and advantages thereof, can be better understood by referring to the following description taken in conjunction with the accompanying drawings, in which:

DESCRIPTION OF THE PREFERRED EMBODIMENT

Figure 1:
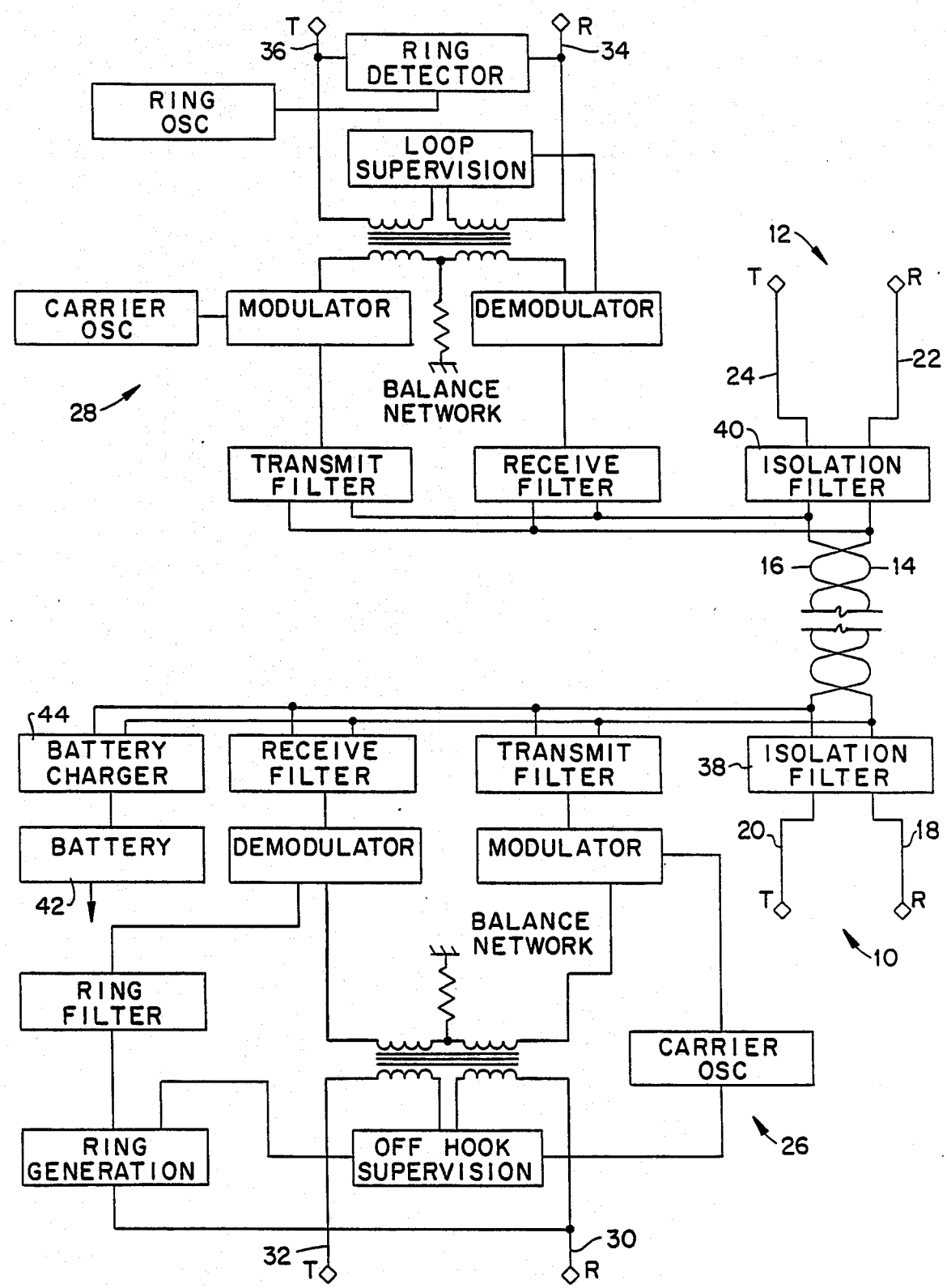
FIG. 1 is a schematic circuit diagram of a single channel subscriber carrier circuit of the prior art.
Figure 2:
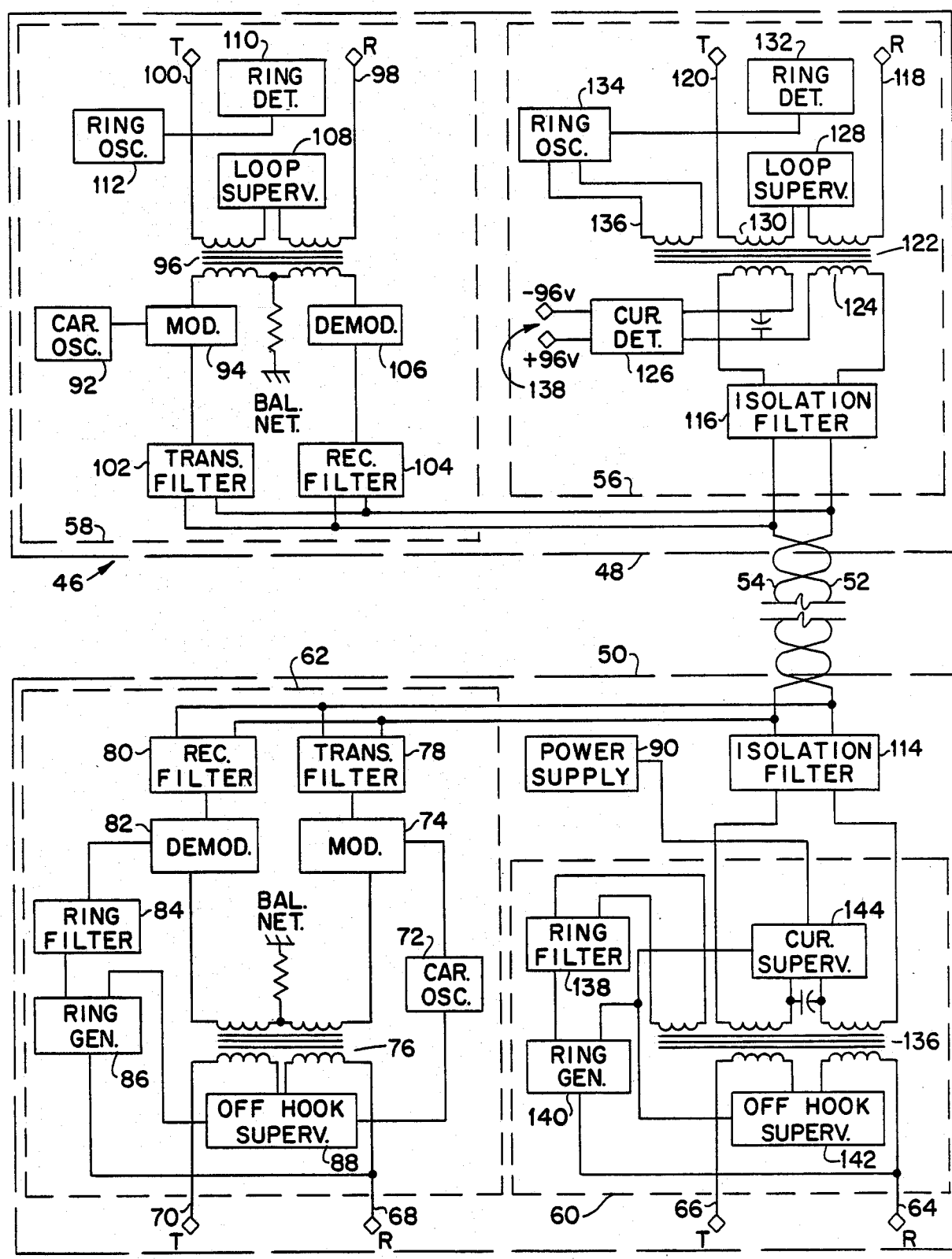
FIG. 2 is a schematic diagram of a single channel subscriber carrier circuit incorporating the subject invention.

Referring now more particularly to FIG. 2, there is provided a single channel carrier telephone system 46, including central office terminal side 48, and subscriber terminal side 50, which are connected together through a single pair of metallic conductors 52 and 54. The central office terminal side of the circuit includes voice frequency central office terminal circuit 56 and carrier frequency central office terminal circuit 58. The subscriber terminal side 50 includes voice frequency subscriber terminal circuit 60 and carrier frequency subscriber terminal circuit 62. Voice frequency terminal 60 is connected to a telephone through lines 64 and 66, while subscriber terminal 62 is connected to a telephone through lines 68 and 70. Carrier subscriber circuit terminal 62 includes carrier oscillater 72 which is connected to modulator 74 for modulating carrier frequency signals normally at a frequency of 28 khz with voice frequency signals which are transmitted through transformer 76. Modulator 74 is also connected to transmit filter 78 for filtering out unwanted signals. The transmit filter is further connected to metallic conductors 52 and 54. Receive filter 80 is also connected to metallic conductors 52 and 54 for receiving the carrier signal from central office carrier terminal 58. The carrier signal is demodulated by demodulator 82, which detects the voice frequency and transmits the voice frequency through transformer 76, which in turn couples the voice signal to the telephone which is connected to lines 68 and 70. A ring filter 84 is connected to ring generator 86 for reconstituting the ringing signal which was detected in central office carrier terminal 58. The ring generator is connected to conductor 68. An off-hook supervision circuit 88 is also connected to the ring generation circuit 86, and the carrier oscillator 72, as well as to transformer 76. It should be noted from the above description of carrier subscriber terminal 62 that there is no battery or battery charger, which is used in the prior art circuits shown in FIG. 1. The power for the carrier subscriber circuit 62, as well as for the voice frequency subscriber circuit 60 is supplied by high voltage power supply 90, which is connected to the electronic circuits of the subscriber terminal side 50.

Central office carrier terminal circuit 58 includes carrier oscillator 92 to modulator 94 for modulating a 76 khz carrier frequency with a voice signal which is received through transformer 96 from conductors 98 and 100. A transmit filter 102 is connected to conductors 52 and 54. A receive filter 104 is also connected to conductors 52 and 54, and is further connected to demodulator 106. Demodulator 106 is also connected to loop supervision circuit 108, which in turn is connected to transformer 96. A ring detector 110 is connected across conductors 98 and 100 and is further connected to ring oscillator 112, which in turn is connected to modulator 94. The ring oscillator is controlled by the ring detector 110 and the output of ring oscillator 112 is detected by ring filter 84 which in turn controls the ring generator 86 in the carrier subscriber circuit terminal 62. Isolation filters 114 and 116 are respectively connected between the carrier subscriber circuit terminal 62 and the voice frequency subscriber circuit terminal 60 and between the central office carrier terminal 58 and the central office voice frequency terminal 56 in order to isolate the carrier frequencies from the voice frequency terminals.

In order to isolate the central office, which is connected to central office voice frequency terminal 56 through conductors 118 and 120, from the +96 volt and the −96 volt high voltage supply 138, an isolation transformer 122 is provided in the central office voice frequency terminal 56. Conductors 52 and 54 are connected to one set of windings 124 of isolation transformer 122 through isolation filter 116. Windings 124 are also connected to the current detector 126, which in turn is connected to loop supervision circuit 128. Loop supervision circuit 128 is connected to two of the three windings 130 on the other side of the isolation transformer 122. Ring detector 132 is connected across conductors 118 and 120 for detecting the ringing signal originating from the central office. The ringing signal itself cannot be transmitted through isolation transformer 122. Ring detector 132 is connected to ring oscillator 134, which is further coupled to isolation transformer 122 through winding 136. Ring oscillator 134 generates a signal of approximately 750 hz modulated by the ringing frequency, which travels through the isolation transformer and onto metallic conductors 52 and 54 and is received at voice frequency subscriber terminal 60. The 750 hz signal is detected and demodulated by the ring filter 138. The signal then controls the ring generator 140 which in turn generates a high voltage ringing signal similar to that detected by ring detector 132. This ringing signal is then applied to subscriber lines 64 and 66. Off-hook supervision circuit 142 is connected to transformer 136 as well as to the current supervision circuit 144. The off-hook supervision circuit 142 is also connected to transformer 136 and to the ring generator. The off-hook supervision circuit 142 detects when the telephone, which is connected to conductors 64 and 66, comes off hook, causing the current supervision circuit 144 to draw a differential current from the connecting cable pairs 52 and 54. This differential current is detected by the current detector 126 which further controls the loop supervision circuit 128 which is connected to the central office lines 118 and 120 through the windings of the isolation transformer 122 and controls the off-hook signal on the central office lines 118 and 120.

Thus, it may be seen that an improved single channel subscriber carrier telephone system has been provided and that the subscriber battery and all of the previously described problems associated with the battery has been eliminated. With the exception of the elimination of the battery and the circuitry necessary to isolate the signaling from the high voltage, the circuitry for the carrier channel is substantially the same as the prior art. The circuitry for the voice frequency channel, however, has been substantially modified. At the central office end of the voice frequency channel, a central office line interface including a ring detector, loop supervision circuit, ring osciallator, and an isolation transformer is installed, which isolates the supervision functions from the metallic line. With the central office isolated from the metallic line, it is possible to use a power source which is independent of the central office line loop supervision. With this independent power source 138, it is now possible to transmit a sufficient amount of power to supply both subscribers in all states, including on-hook, off-hook and ringing. A second interface is also utilized to interface the voice frequency subscriber to the metallic line. Since normal ringing signals will not pass through isolation transformer 122, the ringing signal is detected at the central office end by the ring detector, and is then used to modulate the ring oscillator. The signal generated by the ring oscillator is detected by the ring filter 138 and used to control the ring generator 140 at the subscriber end. The on-hook/off-hook supervision is transmitted to the central office for the voice frequency channel by causing a differential current in the metal pair of conductors 52 and 54 above a predetermined threshold which is detected by detector 126 and used to control the loop supervision which is sent to the central office.

The above described circuit, by eliminating the battery, permits longer loops of up to 1000 ohms between each subscriber terminal and the telephone set and, furthermore, is much more reliable. All of the circuits which are within block diagrams represented in the drawing are standard circuits known to those skilled in the art in the telephony business.

From the foregoing description of the preferred embodiment of the invention, it will be apparent that many modifications may be made herein. It is understood that this embodiment of the invention is intended as an exemplification of the invention only, and that the invention is not limited thereto. It is to be understood, therefore, that it is intended in the appended claims to cover all such modifications which fall within the true spirit and scope of the invention.

I claim:

1. An electrical circuit for use with a telephone system having voice frequency and station carrier channels, said system comprising:
   a pair of metallic conductors;
   a first subscriber terminal circuit including means for transmitting and receiving information on voice frequencies;
   a second subscriber terminal circuit including means for modulating a carrier signal with a first voice signal provided by said second subscriber circuit and transmitting a resultant first modulated carrier signal over said pair of metallic conductors and means for receiving a second modulated carrier signal from said pair of metallic conductors and demodulating said second modulated signal to yield a second voice signal;
   a first central office terminal circuit including means for transmitting and receiving information on voice frequencies and first supervision means for generating line supervision signals and transmitting information corresponding to said line supervision signals over said pair of metallic conductors;
   a second central office terminal circuit including means for modulating a carrier signal with said second voice signal to produce said second modulated carrier signal and transmitting said second modulated carrier signal over said pair of metallic conductors and means for receiving said first modulated carrier signal from said pair of metallic conductors and demodulating said first modulated carrier signal to yield said first voice signal;
   a power supply means coupled to said pair of metallic conductors and to said first and second subscriber circuits for operating said first and second subscriber circuits; and
   means for isolating said first supervision means of said first central office terminal circuit from said power supply to prevent said power supply from interfering with said line supervision information.

2. A circuit as set forth in claim 1, wherein said means for isolating includes an isolation transformer connected between said power supply means and said supervision means.

3. A circuit as set forth in claim 2, wherein
   said isolation transformer comprises first and second primary windings on the side of said isolation transformer which is isolated from first said supervision means, one end of said first primary winding being connected to receive current from said power supply means and one end of said second primary winding being connected to return said current to said power supply means; and
   said isolation transformer is connected between said pair of metallic conductors and said supervision means.

4. A circuit as set forth in claim 2, wherein
   said first central office terminal circuit further includes a ring detector and a ring oscillator connected to said ring detector, said ring oscillator connected to the first supervision means side of said isolation transformer, said isolation transformer adapted to pass signals generated from said ring oscillator to said pair of metallic conductors; and
   said first subscriber terminal circuit further includes means for detecting the signals generated from said ring oscillator and means for generating a ring signal in response to said means for detecting.

5. A circuit as set forth in claim 1, wherein
   said first subscriber terminal circuit further comprises means for detecting off-hook status, and means for transmitting a signal over said pair of metallic conductors in response to off-hook status, and wherein said first central office terminal circuit further comprises means for detecting said off-hook status signal tramsmitted over said pair of metallic conductors.

6. A circuit as set forth in claim 5, wherein said means for detecting in said first central office terminal circuit is a high/low current detector.

7. A circuit as set forth in claim 6, wherein said means for detecting in said first central office terminal circuit is a differential current detector.

8. A circuit as set forth in claim 1, further including a first isolation filter connected between said pair of metallic conductors and said first subscriber terminal circuit and a second isolation filter connected between said pair of metallic conductors and said first central office terminal circuit for isolating said first subscriber terminal circuit and said first central office terminal circuit from carrier frequencies.

9. A circuit as set forth in claim 1, wherein said second subscriber terminal circuit does not include a battery.

10. A circuit as set forth in claim 2, wherein
    said isolation transformer comprises first and second primary windings on the side of said isolation transformer which is isolated from said supervision means, one end of said first primary winding being connected to receive current from said power supply means and one end of said second primary winding being connected to return said current to said power supply means, and said means for isolating includes an isolation capacitor connected between said first and second primary windings.

11. A circuit as set forth in claim 2, wherein said power supply means is located within said first central office terminal circuit.

12. A circuit as set forth in claim 1, wherein said power supply means interfaces to the end of said pair of metallic conductors adjacent to said first and second central office terminal circuits, and supplies all the power needed to operate said first subscriber terminal circuit.

13. A circuit as set forth in claim 12, wherein said power supply means also supplies all the power needed to operate said second subscriber terminal circuit; and said first subscriber terminal circuit includes means for operating from said power supply means continuously without the need for a battery, and said second subscriber terminal circuit includes means for operating from said power supply means continuously without the need for a battery.

14. A circuit as set forth in claim 11, wherein said power supply means delivers operating current to said first subscriber terminal circuit while said first subscriber terminal circuit exhibits an off-hook condition.

15. A circuit as set forth in claim 13, wherein said first subscriber terminal circuiting includes means for drawing operating current from said power supply means during an off-hook condition of said first subscriber terminal circuit; and said second subscriber terminal circuit includes means for drawing operating current from said power supply means during an off-hook condition of said second subscriber terminal circuit.

16. A circuit as set forth in claim 2, wherein said power supply means interfaces to the end of said pair of metallic conductors adjacent to said subscriber terminal circuits.

17. A circuit as set forth in claim 1, wherein said first subscriber terminal circuit further comprises second supervision means for generating line supervision signals, and means for isolating said second supervision means from said power supply means whereby said power supply means does not interfere with normal loop supervision.

18. A circuit as set forth in claim 1, wherein said power supply means is a DC power source and said means for isolating said first supervision means from said power supply prevents DC current provided by said power source from being transmitted to said first supervision means.

19. A circuit as set forth in claim 2 wherein said information of said line supervision signals is transmitted across said isolation transformer.

20. An electrical circuit for use with a telephone system having voice frequency and station carrier channels, said circuit comprising:

a first subscriber terminal circuit adapted to transmit and receive information on voice frequencies;

a second subscriber terminal circuit adapted to transmit and receive information on carrier frequencies; said second subscriber circuit including means interfaced to said first subscriber circuit for modulating voice frequencies with a carrier signal to transmit the carrier signal and means for demodulating carrier signals to convert said carrier signals to voice frequencies;

a first central office terminal circuit adapted to transmit and receive information on voice frequencies;

a second central office terminal circuit adapted to transmit and receive information on carrier frequencies; said second central office circuit including means interfaced to said first office terminal circuit for modulating voice frequencies with a carrier signal to transmit the carrier signal and means for demodulating carrier signals to convert said carrier signals to voice frequencies;

a pair of metallic conductors connecting said second subscriber terminal circuit to said second central office terminal circuit, said conductors transmitting carrier signals and loop supervision information;

a DC power supply connected to said first and second subscriber circuits for operating said first and second subscriber circuits; and means for isolating a portion of said first central office terminal circuit which generates low frequency loop supervision signals corresponding to said loop supervision information from said DC current of said power supply so that said DC current does not interfere with normal loop supervision.

21. A circuit as set forth in claim 20, wherein said means for isolating includes an isolation transformer connected between a telephone interface of said first central office terminal circuit and said power supply.

22. A circuit as set forth in claim 21, wherein said first central office terminal further includes a ring detector and a ring oscillator connected to said ring detector, said ring oscillator connected to the central office side of said isolation transformer, said isolation transformer adapted to pass signals generated from said ring oscillator to said pair of metallic conductors; and said first subscriber terminal circuit further includes means for detecting the signal generated from said ring osciallator and means for generating a ring signal in response to said means for detecting.

23. A circuit as set forth in claim 20, wherein said first subscriber terminal circuit further includes means for detecting off-hook status and means for generating a signal onto said metallic conductors in response to off-hook status; and said first central office terminal circuit further includes means for detecting said off-hook signal generated on said metallic conductor.

* * * * *